United States Patent [19]

Durboraw, III

[11] Patent Number: 5,266,958
[45] Date of Patent: Nov. 30, 1993

[54] DIRECTION INDICATING APPARATUS AND METHOD

[75] Inventor: Isaac N. Durboraw, III, Scottsdale, Ariz.

[73] Assignee: Motorola, Inc., Schaumburg, Ill.

[21] Appl. No.: 982,348

[22] Filed: Nov. 27, 1992

[51] Int. Cl.$^5$ .................... H04B 7/185; G01S 5/02
[52] U.S. Cl. ........................... 342/357; 342/419
[58] Field of Search ........................ 342/357, 419

[56] References Cited

U.S. PATENT DOCUMENTS

| | | | |
|---|---|---|---|
| 2,861,264 | 11/1958 | Lair | 343/113 |
| 4,599,620 | 7/1986 | Evans | 343/357 |
| 4,672,382 | 6/1987 | Fukuhara et al. | 342/357 |
| 4,741,245 | 5/1988 | Malone | 89/41.03 |
| 4,881,080 | 11/1989 | Jablonski | 342/357 |
| 4,897,642 | 1/1990 | DiLullo et al. | 340/825 |
| 4,903,212 | 2/1990 | Yokouchi et al. | 364/449 |
| 4,949,089 | 8/1990 | Ruszkowski | 342/52 |
| 4,954,833 | 9/1990 | Evans et al. | 342/357 |
| 5,043,736 | 8/1991 | Darnell et al. | 342/357 |
| 5,089,816 | 2/1992 | Holmes, Jr. | 340/995 |
| 5,146,231 | 9/1992 | Ghaem et al. | 342/419 |
| 5,173,709 | 12/1992 | Lauro et al. | 342/443 |

OTHER PUBLICATIONS

An article entitled "Design and Predicted Performance of GPS Demonstration Receiver for the NASA TOPEX Satellite" by Lance Carson, et al., Proceedings of the Position Location and Navigation Symposium (PLANS88), IEEE, 1988, pp. 442-454.

An article entitled "Digital Technology Applied To Airborne Receivers" by Jean Paul Lacroix, Proceedings of the ION GPS-90 Third International Technical Meeting of the Satellite Division of the Institute of Navigation, Colorado Springs, Colorado, Sep. 19-21.1990, pp. 41-47.

An article entitled "A Geodetic Survey Receiver With Up To 12 L1 C/A Code Channels and 12 L2 Pseudo--Code Channels" by Timo Allison, et al., from Proceedings of the ION GPS-90 Third International Technical Meeting of the Satellite Division of the Institute of Navigation, Colorado Springs, Colorado, Sep. 19-21, 1990, pp. 31-40.

An article entitled "Principle of Operation of NAVSTAR and System Characteristics" by R. J. Milliken and C. J. Zoller from Global Positioning System by the Institute of Navigation, 1990.

An article entitled "GPS Measurement of Attitude" by S. J. DiNardo, et al., NASA's Jet Propulsion Laboratory, Pasadena, California, from NASA Tech Briefs, Aug. 1992.

Primary Examiner—Theodore M. Blum
Attorney, Agent, or Firm—Robert M. Handy; Frederick M. Fliegel

[57] ABSTRACT

A GPS receiver (10) with processor (14, 16), memory (18), input (20) and indicator (22), uses conventional code pseudorange and carrier phase to provide a compass function. The receiver antenna (12) is desirably held stationary while the directional vectors toward the satellites and for the desired heading (21) are computed, the rate of change of carrier phase determined and future carrier phase predicted. The antenna (12) is then moved in a closed path (11) while the differences between predicted and actual carrier phase are measured and converted to positional perturbations which are resolved along the desired heading (21) and normal thereto. As the antenna (12) moves around the closed path (11), the resolved perturbations have maxima, minima or change sign and the processor (14, 16) uses this to trigger the indicator (22, 222) so that the desired heading is apparent to the user.

20 Claims, 4 Drawing Sheets

DIRECTION INDICATING APPARATUS AND METHOD

FIELD OF THE INVENTION

This invention relates to an electronic apparatus and method for providing a direction indicating function without reference to the earth's magnetic field.

BACKGROUND OF THE INVENTION

Electronic geolocation apparatus allows local position on earth to be determined with considerable accuracy (typically +/−100 meters) using signals received, for example, from Global Positioning System (GPS) satellites orbiting the earth. Hand-held GPS receivers are available from a number of commercial sources and are much used by hunters, hikers, mariners, surveyors, military personnel and other persons who have need for instantaneous geolocation data. Multi-channel receivers, i.e., receivers able to simultaneously track several satellites at the same time, are common. Geolocation apparatus of this type is portable, self-contained, comparatively inexpensive (e.g., currently about $10^3$), and in many cases hand holdable. For example, the TRAX-AR ™ and Commando SPS ™ six channel GPS navigator receivers from Motorola, Inc., Scottsdale, Ariz. weight about 0.5 Kgm and have a volume of about $4 \times 10^2$ cc and simultaneously track up to six satellites.

Many GPS units also provide "course-to-steer" information, that is, the heading to be followed to go from one location to another. For example, the user can input latitude and longitude of a desired waypoint, whereupon, the unit will calculate the course-to-steer to go from the present position (determined by the GPS receiver) to the indicated waypoint (supplied by the user). The term "waypoint" generally refers to a desired destination or navigational reference point to be reached, which may be a final destination or one of a series of intermediate destinations or navigational reference points to be traversed. More sophisticated units are able to display the course-to-steer referenced to true north or magnetic north, as the user desires.

While existing GPS units can tell the user a desired course-to-steer to reach a particular destination, e.g., "steer 090 degrees", and they can tell the user what course has been steered, e.g., by keeping track of and displaying successive locations, they are unable to tell the user what course is currently being steered. Thus, in order to take advantage of course-to-steer information the user must still have some independent means (e.g., a compass) for determining current direction or heading. Without landmarks or a compass or equivalent, the course-to-steer information provided by a GPS receiver is useless.

For example, consider a mariner at sea in a dense fog. His geolocation receiver gives the precise location of the boat which can be marked on the mariner's chart. From the same chart the location of a safe harbor and the course-to-steer to reach the harbor can also be determined. But, if the compass is broken and the stars or sun or moon cannot be seen, the mariner cannot determine his current heading. There is no local frame of reference by which the mariner can tell whether the boat is traveling along the desired course-to-steer or along some other direction. The mariner knows where he has been, where he is and, presumably, where he wants to go, but not where he is actually going. Thus, the typical geolocation receiver by itself does not provide all of the information that the mariner (or other traveler) needs for navigation and some other means of determining heading is required.

The lack of navigational orientation information from GPS receivers has long been recognized and several solutions have been described to overcome this, as for example, in U.S. Pat. Nos. 4,599,620 to Evans and 4,881,080 to Jablonski, and in an article by DiNardo et al., entitled "GPS Measurement of Attitude", NASA Tech Briefs, August 1992, page 34.

While these prior art approaches to providing orientation information, e.g., vessel heading or direction, based on GPS are successful for ships, planes and other large objects, they are not suitable for use with portable apparatus, especially hand-held apparatus. With hand-held portable apparatus, it is not practical to have, for example, a two meter rotating antenna or multiple antennas separated by a baseline measuring 32 to 100 meters in length. Thus, a need continues to exist for a means and method for obtaining orientation information (i.e., current heading) from portable geolocation apparatus, especially GPS geolocation apparatus. It is especially desirable to be able to provide such information with a single hand-held portable apparatus.

As used herein, the words "heading" and "course" are used interchangeably to indicate vectors pointing in a particular spatial direction. The words "level plane" or "horizontal" are intended to refer to a plane approximately perpendicular to the earth's gravity vector.

SUMMARY OF THE INVENTION

The present invention advantageously uses a geolocation receiver to provide current heading information without resort to magnetic field sensing or other conventional compass devices. This is achieved in a hand-holdable unit without significant volume, weight or size penalty.

The forgoing and other advantages are provided by, a portable direction indicating apparatus and associated method comprising, an input for receiving information determinative of a heading a user desires to be indicated, an indicator for indicating the desired heading, a geolocation receiver for providing code pseudorange and carrier phase information and having an antenna, a memory for storing at least desired heading and future estimated carrier phase information, and a processor coupled to the geolocation receiver, the input, the memory and the indicator, wherein (a) while the antenna is in one or more known positions, the processor obtains then current carrier phase from the receiver and forecasts future carrier phase, (b) while the antenna is then being moved in a substantially closed path, the processor determines differences between the forecasted carrier phase and actual carrier phase, and (c) the processor then uses the phase differences to actuate the indicator to identify when the location of the antenna on the approximately closed path corresponds to the heading desired to be indicated.

Any desired heading can be selected by the user. The operation of the unit is independent of the earth's magnetic field and derives its directional indication entirely from information obtained from the geolocation satellites and the desired course heading input by the user.

DETAILED DESCRIPTION OF THE PREFERRED EMBODIMENT

Figures 1, 2:
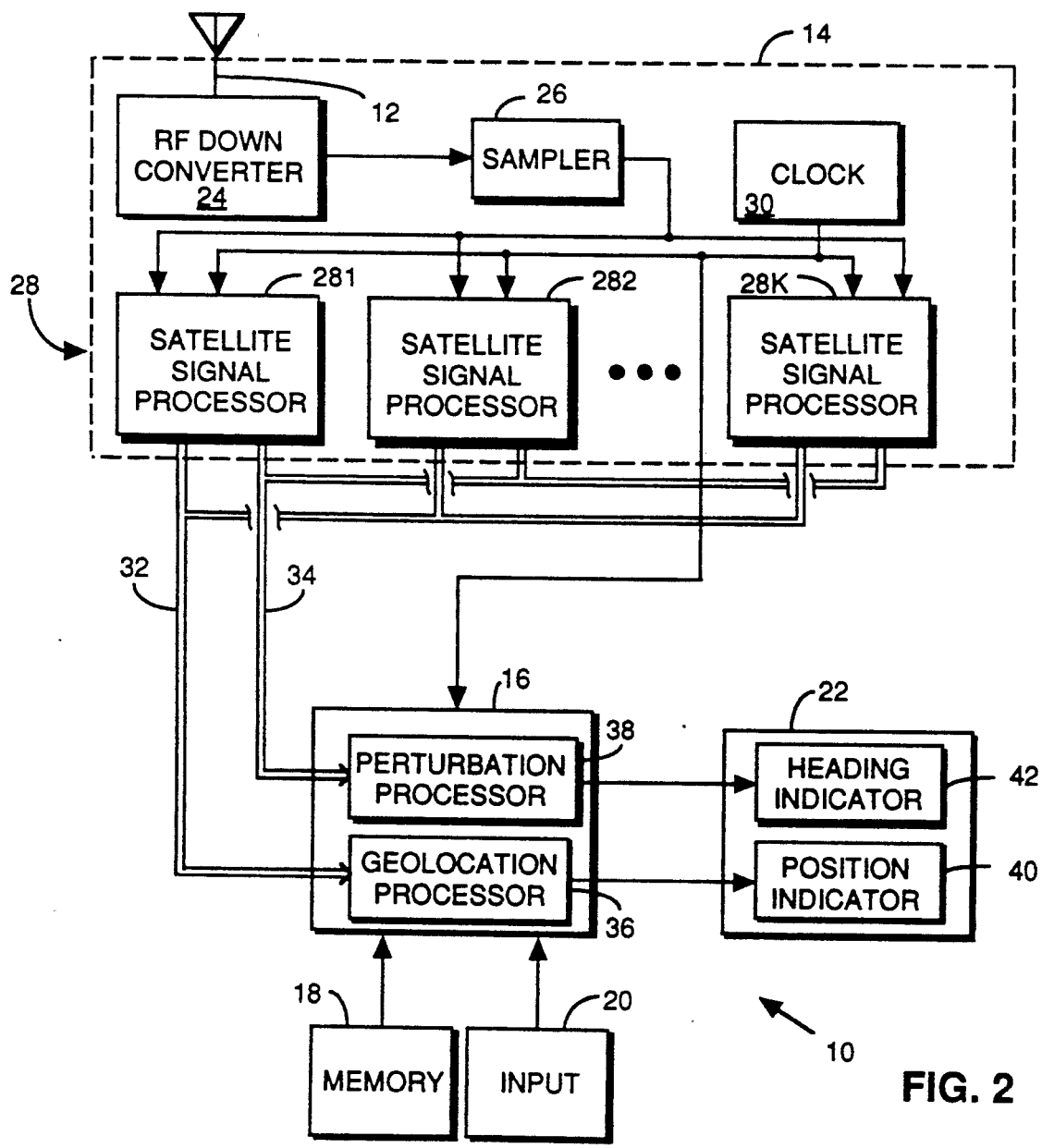
FIG. 1 is simplified schematic block diagram of a heading indicating geolocation receiver according to a preferred embodiment of the present invention.
FIG. 2 is a simplified schematic block diagram of the unit of FIG. 1, but in somewhat greater detail.

FIG. 1 is a simplified schematic block diagram of direction indicating apparatus 10 according to the present invention. Direction indicating apparatus 10 comprises antenna 12, GPS receiver 14, computational processor 16, memory 18, input means 20 and indicator 22. Input means 20 desirably includes various switches or a small keyboard (e.g., see FIG. 4) by which a user may directly enter data or other information into apparatus 10, or input device make various choices concerning its mode of operation, but input 20 may also include a port (not shown) by which information or operational settings are entered electronically, as for example, an RS-232 port. As used herein, the word "input" is intended to include any means or method of entering data or information into apparatus 10.

For convenience of use in a hand-held, portable unit, it is preferred that keyboard and/or switch type data entry capability be included as part of input means 20 so that a user in the field may directly enter information and choose operational modes without need for an electronic interface, but this is not essential. The user enters information which determines the heading which he or she wants apparatus 10 to indicate by means of indicator 22.

Indicator 22 communicates the desired heading and other information generated by apparatus 10 (e.g., current position, battery status, etc.) to the user. Non-limiting examples of suitable indicators are optical displays such as vacuum fluorescent displays (VFD), liquid crystal displays (LCD), light emitting diodes or diode arrays (LED), and/or cathode ray tubes (CRT), or audible or vibrational annunciators or an electronic output such as another RS-232 port, or some combination of the above. As used herein, the word "indicator" is intended to include any means and method of providing a user with information.

FIG. 2 is a simplified schematic block diagram of direction indicating apparatus 10 of FIG. 1, but showing greater detail. Like reference numerals are used to identify functionally equivalent blocks in each figure.

GPS receiver 14 desirably comprises RF down-converter 24, sampler 26, multi-channel GPS satellite signal processor 28 and clock 30. Satellite signal processor 28 desirably comprises multiple signal processors 281, 282, ..., 28K, where K identifies the total number of satellites to be tracked. Generally K should be at least 4, with 5 to 6 satellites being preferred. Larger numbers of satellites may also be used. Lower case k is used throughout as an index identifying which of the K satellites is being considered.

While it is preferred to have multiple signal processors 281-28K (i.e., a multi-channel unit), so that signals from the K satellites can be analyzed simultaneously, those of skill in the art will understand that a single GPS signal processor can be used sequentially to analyze the signals from each of the K satellites. However, this is less convenient since it is important in connection with the present invention that the code pseudorange and carrier phase data samples from the satellites all be obtained substantially at the same time.

GPS signal processor 28 provides code pseudorange information on output 32 and carrier phase information on output 34. Satellite signal processor 28 and its outputs 32, 34 for code pseudorange and carrier phase are conventional. It is desirable that operation of satellite signal processor 28 and outputs 32, 34 be synchronized by clock 30 so that code pseudorange and carrier phase data obtained from various satellites on outputs 32, 34 correspond to substantially the same clock time. This reduces the effect of clock errors on the results. While it is important that the code pseudorange and carrier phase data being generated by satellite signal processors 281-28K all be sampled at the same time, it is not necessary that such data all be sent to processor 16 simultaneously. The data can equally well be sampled simultaneously, temporarily stored and sent sequentially, as is common, for example, with multiplexed data transfer.

GPS receivers 14 generally provide code pseudorange and carrier phase data or information at regular intervals, for example, about 1-2 times per second and typically about 1 times per second. The rate at which code pseudorange information is available is determined generally by noise considerations and requirements of the application, i.e., how fast is position likely to change. For most applications, a code pseudorange data rate of one sample per second is adequate.

Carrier phase data is generally much less noisy than code pseudorange data and therefore can be obtained at higher rates. The rate at which useful carrier phase information is available is determined by the bandwidth of the carrier tracking loop, which is typically about 20-30 Hertz. Thus, even in units which ordinarily provide code pseudorange and carrier phase data about once per second, carrier phase data can be obtained at rates at least an order of magnitude greater without a sacrifice of signal to noise ratio, that is, up to about 20-30 times per second or more.

For the purposes of the present invention, having code pseudorange data available about once per second is generally sufficient. It is desirable however, that carrier phase data be available more frequently, as for example, about 5-30 times per second is convenient and at least 10-20 times per second is preferred.

Code pseudorange data output 32 and carrier phase data output 34 are coupled to processor 16. For convenience, processor 16 may be thought of as comprising two processing functions, geolocation processor 36 and perturbation processor 38. However, those of skill in the art will understand that one physical processor may (and preferably does) perform both functions. The manner in which processor 16 functions will be more fully understood in connection with the operation of unit 10 illustrated in FIGS. 3-6 and the program flow charts of FIGS. 7-8.

Code pseudorange data provided by satellite signal processors 281-28K on outputs 32 is coupled to geolocation processor portion 36 of processor 16, which in turn, provides location coordinates and other conventional GPS output information to position indicator portion 40 of indicator 22. Carrier phase data provided by satellite signal processors 281-28K on outputs 34 is coupled to perturbation processor portion 38 of processor 16, which in turn, provides heading information to heading indicator portion 42 of indicator 22. The computer program code needed to operate processor 16, the geolocation data and various intermediate calculation results are stored in memory 18 which is coupled to processor 16. Memory 18 conveniently comprises read only memory (ROM) which is convenient for program storage, and read-write memory (e.g., RAM) which is convenient for data and intermediate computation storage. Means and methods for coupling memory and processors so that programs, data and other information may be stored and retrieved are well known in the art and are typically handled by a conventional processor operating system.

Input 20 coupled to processor 16, allows user 8 (see FIGS. 3–6) to provide information on a desired heading, initial location if needed, waypoints, and various other data or instructions, as desired. This information is conveniently stored in memory 18 until needed. In the preferred embodiment, clock 30, provides a common time and common time increments (referred to herein as "epochs") for satellite signal processors 281-28K and processor 16, so that code pseudorange and carrier phase data being obtained from various satellites k=1,2, ..., K may be sampled at substantially the same time.

Heading information is generated by apparatus or unit 10 in two steps.

Step (1), which is a calibration step, occurs during a calibration time interval when antenna 12 of apparatus 10 is in a known location (preferably stationary). During the calibration step, the parameters of a time dependent model of the carrier phase are determined and used to predict the carrier phase expected during a subsequent measurement interval. These predictions take into account continuing motion of the GPS satellites in their orbits, errors in the satellite and receiver clocks, and other factors such as on-going motion of antenna 12 (apart from the closed path motion described in step 2) if any, which can affect future carrier phase.

Figure 4:
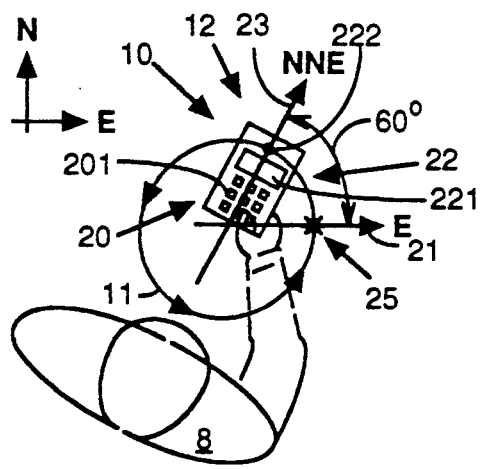
Figure 5:
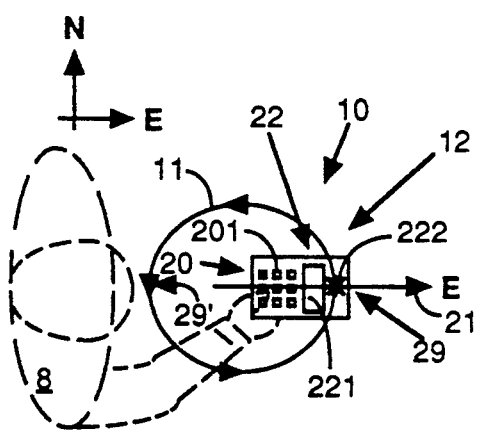
Figure 6:
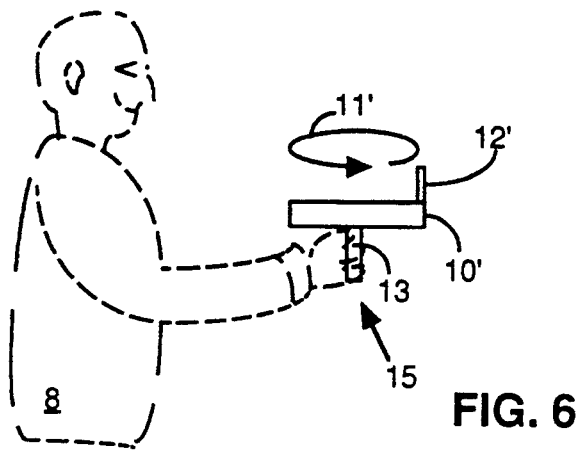
FIG. 6 is a view similar to FIG. 3 but illustrating a further embodiment of the present invention.

Step (2), which is a measurement step, occurs during a subsequent measurement interval when antenna 12 of apparatus 10 is deliberately moved by the user in a closed path (e.g., see FIGS. 4–6). The closed path need not be very large (e.g., about 0.15–0.3 m diameter) nor have precisely predetermined dimensions nor have a precise shape. The differences between the actual and predicted phase are determined for successive time epochs during the measurement interval. These phase differences are then used to compute perturbations in the antenna position in a manner related to the desired heading. The point on the closed path corresponding to the desired heading is determined therefrom and the heading indicator actuated when the unit moves through that point on its way around the closed path.

While it is desirable that the antenna be fixed during the calibration interval, this is not essential, provided that its location is determinable during the calibration interval and predictable during the measurement interval so that the phase changes arising from any on-going antenna motion unrelated to the close-path motion may be accurately forecast during the measurement interval and accounted for in evaluating the phase changes induced by movement of the antenna around the closed path.

As used herein, the words "observation interval" are intended to refer to the combination of the calibration interval and the measurement interval and the words "observation step" are, analogously, intended to refer to the combination of the calibration step and the measurement step. As those of skill in the art will understand based on the explanation herein, it is motion of receiver antenna 12 that is needed, not motion of unit 10 or receiver 14 itself. However, with small hand-holdable units (e.g., see FIGS. 3–6), antenna 12 is often an integral part of unit 10 and user 8 may produce motion of antenna 12 by moving unit 10 as a whole. As used herein, references to motion or movement and the like are intended to antenna 12, whether integral or not.

EXAMPLE

Figure 3:
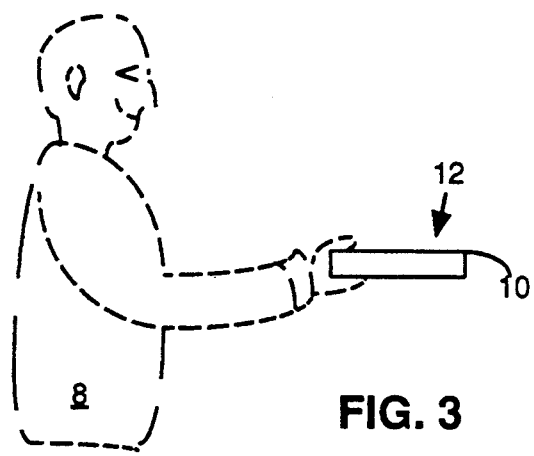
FIG. 3 is a side view and FIGS. 4-5 are top views of an example of the use of the present invention by a person.

A simple example of how apparatus 10 of the present invention functions is now described. FIGS. 3 and 6 show side views of user 8 holding heading indicating unit 10 and FIGS. 4–5 show top views illustrating typical movement path 11 of antenna 12 of unit 10 during the measurement interval. For purposes of explanation, FIGS. 3–5 show an embodiment wherein (i) antenna 12 is integral with unit 10, (ii) indicator 22 comprises LCD display 221 for showing conventional navigational information (e.g., current location, course-to-steer, etc.) and LED (or other lamp) 222 for indicating the desired heading, and (iii) input 20 comprises small keyboard 201. For convenience of explanation, movement path 11 is illustrated in FIGS. 4–5 as being circular and the direction of motion as being counter-clockwise when viewed from above, but this is not essential. Either direction of movement may be used. An elliptical, circular or polygonal path is suitable no matter what the orientation of the user and the desired heading. As used herein, the words "circle" and "circular" are intended to include any closed path whatever the shape of the enclosed area. As will be subsequently explained, at certain orientations, e.g., with a user facing the desired heading, the closed path may be curvalinear (i.e., back-and-forth in a line or arc) rather than circular (i.e., round-and-round a central area). For simplicity of illustration, it is assumed in connection with FIGS. 3–6, that unit 10 is stationary except for motion around path 11.

By way of example, user 8 inputs a desired heading (e.g., direction 21) and initiates the heading determination sequence. User 8 desirably holds unit 10 steady (e.g., see FIG. 3) during a brief (e.g., about 2–3 sec) calibration interval. The completion of the calibration step may be announced, for example, by a suitable audible alarm or a visual indication or other means.

The measurement step and interval is, desirably, begun as soon as the calibration step and interval is complete. Unit 10 may automatically tell the user to start the measurement step and interval by, for example, giving a voice (or visual) command through indicator 22 to "rotate". User 8 then moves antenna 12, in a cyclic manner around closed horizontal path 11 as shown for example in FIGS. 4–6. The diameter of path 11 is, for example, about 0.2 m. The duration of closed-path motion during the measurement interval is desirably longer than the calibration interval (e.g., about 2–3 times as long) but still brief. For example, a measurement interval of about 4–9 seconds is suitable. The diameter, shape and location of closed path 11 are not critical and an excursion of about 0.15–0.3 m diameter or larger may be used. The period of motion around the closed path is also not particularly critical. A period of about 0.5–3 seconds per traverse of the closed path is useful with a period of about 1–2 seconds per traverse being preferred, but larger and smaller periods may also be used.

Processor 16 determines the time (or location) on closed path 11 that corresponds to the desired heading and causes heading indicator 22, 222 to announce the selected heading (e.g., by a a light flash and/or an audible "beep" or both). The flash (and/or beep) is repeated each time during the measurement interval that antenna 12 of unit 10 passes that location on closed path 11 oriented toward the desired heading.

Suppose for example, that user 8 has entered a desired heading of due east (090 degrees) as indicated by arrow 21 (see FIGS. 4–5), and happens to be facing north north-east (NNE=030 degrees) as indicated by arrow 23, while moving antenna 12 of apparatus 10 around horizontal circular path 11, e.g., in front of his or her body. When antenna 12 reaches a point on circular path 11 corresponding to due east direction 21 (090 degrees), indicator 222 flashes, as indicated by the "*" at location 25 on path 11 coincident with arrow 21. To user 8, the flash at location 25 is seen as being about sixty degrees to the right from direction 23 (030 degrees) in which user 8 is facing, i.e., at user 8's "two-o'clock" position, where user 8's "twelve-o'clock" position is considered to be dead-ahead and "six-o'clock" is considered to be dead-astern. This situation is depicted in FIG. 4.

User 8 can orient himself or herself (or the vessel or vehicle being steered) to desired heading 21 by, for example, turning to the right sixty degrees until indicator 222 flashes at the furthest outboard (dead-ahead) point on path 11, as indicated in FIG. 5 by the "*" at location 29 on path 11, coincident with arrow 21. (If the user had turned to face 270 degrees, then indicator 222 would flash when antenna 12 was at nearest inboard (dead-ahead) point 29' on circle 11.) With unit 10 flashing at furthest outboard point 29 on circle 11 (i.e., at "twelve-o'clock"), then user 8 knows that he or she (or the vessel or vehicle being steered) is pointed due east in the direction of arrow 21. This situation is illustrated in FIG. 5. The user may repeat the observation (calibration+measurement) procedure as often as desired to establish or confirm a desired heading. It does not matter which way the user is initially facing.

It is not necessary that the desired course direction and the indicated heading be the same. For example, user 8 may select an indicated heading of due north and be able to proceed due east by keeping the flashing of heading indicator 222 oriented at right angles to the left of the direction of travel, i.e., at user 8's "nine-o'clock" position.

The following is a description of a preferred method for the calibration and measurements steps, including computing various factors useful for indicating the desired headings. In a preferred embodiment, time dependent carrier phase values $\Phi_{mk}(t)$ are measured during the calibration and measurement intervals at predetermined time epochs. These time epochs are conveniently of equal duration so that carrier phase observation times are evenly spaced, but this is not essential. It is convenient to use time epoch durations equal to the reciprocal of the carrier phase data rate, e.g., about in the range 0.03–0.1 seconds. Thus, as used herein, t represents time conveniently measured in multiples of the predetermined epoch duration and functions as an index taking on values of t=1,2,..., N during the calibration interval and taking on values t>N during the measurement interval. The subscript m indicates that carrier phase values referred to are measured values (e.g., obtained from GPS signal processor 28), and the subscript k identifies the particular satellite involved.

The vector $b_k$ is formed by weighting the N carrier phase observations $\Phi_{mk}(t)$ for t=1, 2, ... N and summing the terms, according to Eq. 1, as follows. The vertical lines enclosing the terms $SUM_t$ [...] in Eq. 1 and various other terms in Eqs. 2–3 and 7–12 are used to indicate matrix notation.

$$b_k = \begin{vmatrix} SUM_t \ [\Phi_{mk}(t)] \\ SUM^t \ [t*\Phi_{mk}(t)] \\ SUM_t \ [t^{2*}\Phi_{mk}(t)] \end{vmatrix} \quad (1)$$

The summations over t (i.e., $SUM_t$ [...]) are evaluated for t=1 to t=N where t identifies the successive time epochs and N is the number of carrier phase measurements used for prediction purposes for each satellite k. It will be noted that the vector $b_k$ is conveniently determined during the calibration interval for each of the k=1, 2, 3, ..., K satellites.

It is convenient to calculate a matrix $(AA^T)$ as shown below. The superscript T is consistently used throughout the discussion in connection with vectors and arrays represented in matrix notation, to indicate "transpose", that is for example, $A^T$ is the transpose of the A. Such convention is well known in matrix notation.

$$(AA^T) = \begin{vmatrix} n & SUM_t \ [t] & SUM_t \ [t^2] \\ SUM_t \ [t] & SUM_t \ [t^2] & SUM_t \ [t^3] \\ SUM_t \ [t^2] & SUM_t \ [t^3] & SUM_t \ [t^4] \end{vmatrix} \quad (2)$$

where the summations over t (i.e., $SUM_t$ [...]) are evaluated for t=1 to t=N. It will be noted that the $(AA^T)$ matrix depends only on the time intervals t and the number of samples N, and if these are unchanged from calibration interval to calibration interval (which is preferred), then the $(AA^T)$ matrix may be pre-computed and stored in a look-up table, for example in memory 18.

The calibration interval is generally comparatively brief, e.g., usefully about 1–5 seconds, conveniently about 1.5–3 seconds and typically about 2 seconds. It should be long enough to permit reasonably accurate measurements of the change of carrier phase, so that sufficiently accurate predictions of future carrier phase during the subsequent measurement interval may be constructed, based on the values observed during the calibration interval. With a carrier phase data rate of about 5–20 observations per second and a calibration interval of about 2 seconds, one can obtain about 10–40 carrier phase observations during the calibration interval. Generally, at least about 30 carrier phase observations during the calibration interval are desirable. In the preferred embodiment, the measurement interval is conveniently about 2–3 times the duration of the calibration interval, for example, about 4–9 seconds and preferably about 4–6 seconds. The measurement interval desirably follows approximately immediately after the calibration interval before the accuracy of the phase change predictions can significantly degrade.

A set of regression coefficients $a_{ik}$ (i=0, 1, 2) are desirably calculated for each of the k satellites, as follows:

$$\begin{vmatrix} a_{0k} \\ a_{1k} \\ a_{2k} \end{vmatrix} = (AA^T)^{-1} * b_k \qquad k = 1, 2, 3, \ldots K. \tag{3}$$

The superscript $()^{-1}$ is consistently used herein to indicate "inverse" in matrix notation. The $a_{ik}$ parameters are used to provide an equation predicting carrier phase $\Phi_{pk}(t)$ during subsequent time epochs $t > N$ for each satellite, as follows:

$$\Phi_{pk}(t) = a_{0k} + a_{1k}t + a_{2k}t^2 \tag{4}$$

where the subscript p indicates that the phase value referred to is a predicted carrier phase value and, as before, k identifies the particular satellite involved and t is the running time index. The values of t range from 1 to N during the calibration interval and then continue from N+1 to, typically, 2N to 3N during the measurement interval. The foregoing equation provides the predicted phase values to be used during the measurement interval. Obtaining the predicted carrier phase values for subsequent use during the measurement interval is a principal purpose of the calibration interval.

The above-described procedure employing linear regression is a convenient way of predicting future values of $\Phi_{pk}(t)$ during the measurement interval based on the behavior of $\Phi_k(t)$ observed during the calibration interval. This takes into account changes in $\Phi_k(t)$ which are due, for example, to the continuing motion of the satellites in their orbits during the measurement interval, as well as variations of the clock error due to a changing offset frequency and other factors. This procedure compensates for non-random phase changes unrelated to the motion of antenna 12 around closed path 11 during the measurement interval, so that the motion of antenna 12 around very small closed path 11 may be detected and used in combination with the satellite and heading vectors for generating the heading indication. Unlike some prior art differential GPS units, only one receiver is required and no attempt is made to determine code pseudorange differences associated with the motion of antenna 12 in path 11.

When the apparatus of the present invention is moved in closed path 11, the measured carrier phase changes in accordance with the closed path motion of antenna 12 as well as the continuing motion of the satellites (and any continuing average motion of antenna 12). The phase differences $\Delta\Phi_k(t)$ associated with the motion of antenna 12 in path 11 are obtained as the differences between the values of $\Phi_{mk}(t)$ observed during the measurement interval (t>N) and the predicted values $\Phi_{pk}(t)$ forecast for t>N based on the observations during the calibration interval ($t \leq N$), as follows:

$$\Delta\Phi_k(t) = \Phi_{mk}(t) - \Phi_{pk}(t) \tag{5}$$

A mathematical model of the phase perturbations $\Delta\Phi_k(t)$ may be represented as a product of a three dimensional unit vector $u_k$ in the direction to the satellite from the receiver location and a three dimensional positional perturbation vector $\Delta r$ representing the user induced motion of the receiver during the measurement interval, as follows $$\Delta\Phi_k(t) = (u_k)^T * \Delta r \tag{6}$$

where both $u_k$ and $\Delta r$ are expressed in earth centered, earth fixed (ECEF) coordinates.

The satellites locations in ECEF coordinates are known at the time that the geolocation (position on earth) of the receiver antenna is conveniently determined from the code pseudorange data, e.g., during the calibration interval. Consequently, the unit vector $u_k$ to each satellite may be readily calculated using simple geometry. Since the position of antenna 12 does not change significantly in relation to the satellites during the few seconds required for calibration and measurement, $u_k$ is substantially constant during the observation interval.

It is convenient to resolve the vector $\Delta r$ into specific vectors related to the desired heading. Let $u_d$ and $u_n$ be the three dimensional unit vectors in ECEF coordinates (defined in the local level plane) representing, respectively, the direction of the desired heading and the normal to the desired heading. If the closed path motion (i.e., path 11) of antenna 12 is primarily horizontal (i.e., lying primarily in the local level plane), then $\Delta r$ may be mathematically modeled as:

$$\Delta r = \beta(t)u_d + \gamma(t)u_n = [u_d, u_n] \begin{vmatrix} \beta(t) \\ \gamma(t) \end{vmatrix} \tag{7}$$

where $\beta(t)$ and $\gamma(t)$ are scalar parameters defining the magnitude of motion of antenna 12 in the respective directions $u_d$, $u_n$, that is, parallel to and normal to the desired heading in the local level plane. Combining the preceding equations yields:

$$\Delta\Phi_k(t) = (u_k)^T * [u_d, u_n] \begin{vmatrix} \beta(t) \\ \gamma(t) \end{vmatrix} \tag{8}$$

The unit vectors $u_k$ are different for each satellite and are computed from the known locations of each satellite and the receiver, respectively. However, they need only be computed once per observation interval. Since they are substantially constant during the observation interval (the angles of the satellites change only slowly), they may be computed at the beginning of or during the calibration interval and used unchanged throughout the measurement interval without significant error. The vectors $u_d$ and $u_n$ are similarly conveniently computed only once per observation interval. They depend on user provided information as to the desired heading (which may be entered at any time and stored in memory 18) and are expressed in the same coordinate system as the $u_k$ vectors.

The phase differences $\Delta\Phi_k(t)$ may be approximated as a simple dot product of two vectors, as follows:

$$\Delta\Phi_k(t) = [w_{dk}, w_{nk}] \begin{vmatrix} \beta(t) \\ \gamma(t) \end{vmatrix} \tag{9}$$

where $w_{dk} = (u_k)^T * u_d$ and $w_{nk} = (u_k)^T * u_n$, are two dimensional vectors that are substantially constant during the observation interval. The subscript d denotes the direction of the desired heading and the subscript n denotes the direction of the normal to the desired heading and k indicates the particular satellite concerned.

A least squares solution is conveniently formed by a simple transformation of the data obtained from the satellites, using the matrix $(CC^T)$ and the vector $\zeta(t)$, defined as follows:

$$(CC^T) = \begin{vmatrix} SUM_k [w_{dk}]^2 & SUM_k [w_{dk} * w_{nk}] \\ SUM_k [w_{nk} * w_{dk}] & SUM_k [w_{nk}]^2 \end{vmatrix} \quad (10)$$

$$\zeta(t) = \begin{vmatrix} SUM_k [w_{dk} * \Delta\Phi_k(t)] \\ SUM_k [w_{nk} * \Delta\Phi_k(t)] \end{vmatrix} \quad (11)$$

where the summations over k (i.e., $SUM_k[\ldots]\ldots$) run from from satellite k=1 to satellite k=K, and d denotes the heading direction and n denotes the normal to the heading direction, and t is the time index, as before. Thus, the multi-satellite solution for perturbation components in the desired heading direction d and the normal to the desired heading direction n, is obtained from:

$$\begin{vmatrix} \beta(t) \\ \gamma(t) \end{vmatrix} = (CC^T)^{-1} \zeta(t) \quad (12)$$

The computation of $\beta(t)$ and $\gamma(t)$ is now relatively simple and may be accomplished by four multiply operations and two addition operations. The inverse matrix $(CC^T)^{-1}$ can be computed one time during the measurement interval and stored as coefficients for use in transformation of the two dimensional vectors $\zeta(t)$ for each value of t.

It will be noted that according to Eq. 12, the computation of $\zeta(t)$ involves the simple weighted summation over k of the carrier phase differences $\Delta\Phi_k(t) = \Phi_{mk}(t) - \Phi_{pk}(t)$ for each satellite, for example, $SUM_k[w_{dk}*\Delta\Phi_k(t)]$ and $SUM_k[w_{nk}*\Delta\Phi_k(t)]$, where $w_{dk}=(u_k)^{T*}u_d$ and $w_{nk}=(u_k)^{T*}u_n$ need only be calculated once during the observation interval and stored for reuse for each value of t. The components $\beta(t)$ and $\gamma(t)$ are scalar factors related to the magnitude of perturbation in antenna position, arising from the motion of antenna 12 around closed path 11, measured in a direction along the desired heading for $\beta(t)$ and in a direction normal to the desired heading for $\gamma(t)$. Thus, the above-described computation converts the observed phase differences $\Delta\Phi_k(t)$ arising from the closed path motion during times t>N, into positional perturbations resolved along the heading vector and the normal to the heading vector.

The time varying scalar factors $\beta(t)$ and 65 (t) are advantageously used to activate indicator 22, 222. Advantage is taken of the fact that $\beta(t)$ and $\gamma(t)$ exhibit maximum and minima for different values of t>N as antenna 12 moves around closed path 11. If antenna 12 was at a fixed location during the calibration step and path 11 has that same location as its center, then $\beta(t)$ and $\gamma(t)$ vary approximately sinusoidally and co-sinusoidally with time. If the antenna location during the calibration step was other than at the center of path 11, then the sinusoidal and co-sinusoidal time variation of $\beta(t)$ and $\gamma(t)$ are off-set from zero by the phase change corresponding to the displacement of the center of closed path 11 from the calibration location.

Assuming that time epochs t are approximately uniform and that motion around closed path 11 is also approximately uniform with a period of about 1–2 seconds and that the carrier phase data is being obtained from geolocation signal processors 28 at about 10–20 or more observations per second, then about 5–40 or more (typically 20–30) carrier phase observations will occur during each pass of antenna 12 around the closed path 11. When antenna 12 goes through that point on closed path 11 which lies in the desired heading direction (e.g., point 25 in FIG. 4 or point 29 in FIG. 5), $\beta(t)$ will be a maximum. Conversely, when antenna 12 passes through that point on path 11 which is at right angles to the desired heading, $\gamma(t)$ will be a maximum. If the antenna was fixed during calibration and the center of path 11 is at that same location, then the sign of $\beta(t)$ and $\gamma(t)$ will reverse as the unit passes toward locations on path 11 which are opposite to the desired heading. If the calibration location and the center of path 11 are not the same, then the resulting off-set of $\beta(t)$ and $\gamma(t)$ from zero can be taken into account, for example, in much the same manner that an AC signal is separated from a DC bias.

By keeping track of successive values of $\beta(t)$ and/or $\gamma(t)$, computation processor 16 can readily determine, using means well known in the art, the time (and equivalently the location) on path 11 at which $\beta(t)$ and/or $\gamma(t)$ have a maximum or minimum or change sign, and activate the indicator accordingly. Whether one uses a maximum or a minimum or sign change or a combination thereof, depends upon the particular implementation desired by the designer, and the manner in which the indicator is intended to announce or show that the unit antenna is at the movement path location corresponding to the heading desired to be indicated. Persons of skill in the art will understand, based on the description herein, how to use the information contained in the factors $\beta(t)$ and/or $\gamma(t)$ to actuate the indicator at the appropriate moment for their purposes.

The preceding examples have described operation of the unit in terms of closed path 11 being approximately circular during the measurement interval, but this is not mandatory and, as referred to herein, closed path 11 is intended to represent paths of any shape circumscribing an enclosed area. Once the desired heading has been generally located and the user is proceeding in that general direction, a user may check for continued alignment with the desired heading by moving the unit in a substantially straight path transverse to the desired heading, and use the change of sign of $\gamma(t)$ and/or the lack of a null of $\beta(t)$ associated therewith to actuate the indicator. This motion may be less tiring for many people than an approximately circular motion or motion in the direction of travel, although any of these can be used.

For transverse linear motion, as long as the user is proceeding along the desired heading, the $\gamma(t)$ component is a maximum. By using, for example, a continuous transverse light bar as an indicator, with the brightness or width of illumination of the light bar correlated to the value of $\gamma(t)$, the user can tell when his/her actual course deviates from the desired heading and make a correction, e.g., the light bar dims or contracts as the actual heading drifts away from the desired heading. A cross-shaped light bar permits the user to employ either transverse or fore-and-aft linear motion or circular motion, as desired, to avoid fatigue. A circular light bar is conveniently employed with circular motion, to provide a light signal indicating the orientation of the chosen heading. LCDs may also be used. For persons without effective sight, an audible or vibratory indicator is convenient.

While the activation of the present invention by means of hand motion in a closed path has been described and is desirable in many situations because of its simplicity, this is not intended to be limiting. The invention works equally well using a motorized arrangement.

For example, FIG. 6 illustrates a side view similar to FIG. 3 of a person holding unit 10' similar to unit 10, but which is modified to have central pivot 13 and peripheral antenna 12'. Unit 10' containing antenna 12' is mounted for example, on central pivot or bearing 13 and is driven in rotary motion by self contained battery operated motor or wind-up spring motor 15, e.g., mounted in pivot 13, or merely by spinning unit 10' around pivot 13 by hand. the net result is that antenna 12' follows path 11' during the measurement interval. Unit 10' functions otherwise in exactly the same fashion as has been previously described, but the user is relieved of the muscular effort of moving antenna 12' in closed path 11' during the measurement interval. The motorized unit desirably remains stationary during the calibration interval. The calibration-measurement sequence may be conveniently controlled automatically by processor 16, so that motor 15 is started automatically by processor 16 as soon as the calibration interval is complete. When the measurement interval is complete, processor 16 desirably shuts off motor 15 and, if desired, re-initiates a calibration interval as soon as antenna 12 comes to rest.

Figure 7:
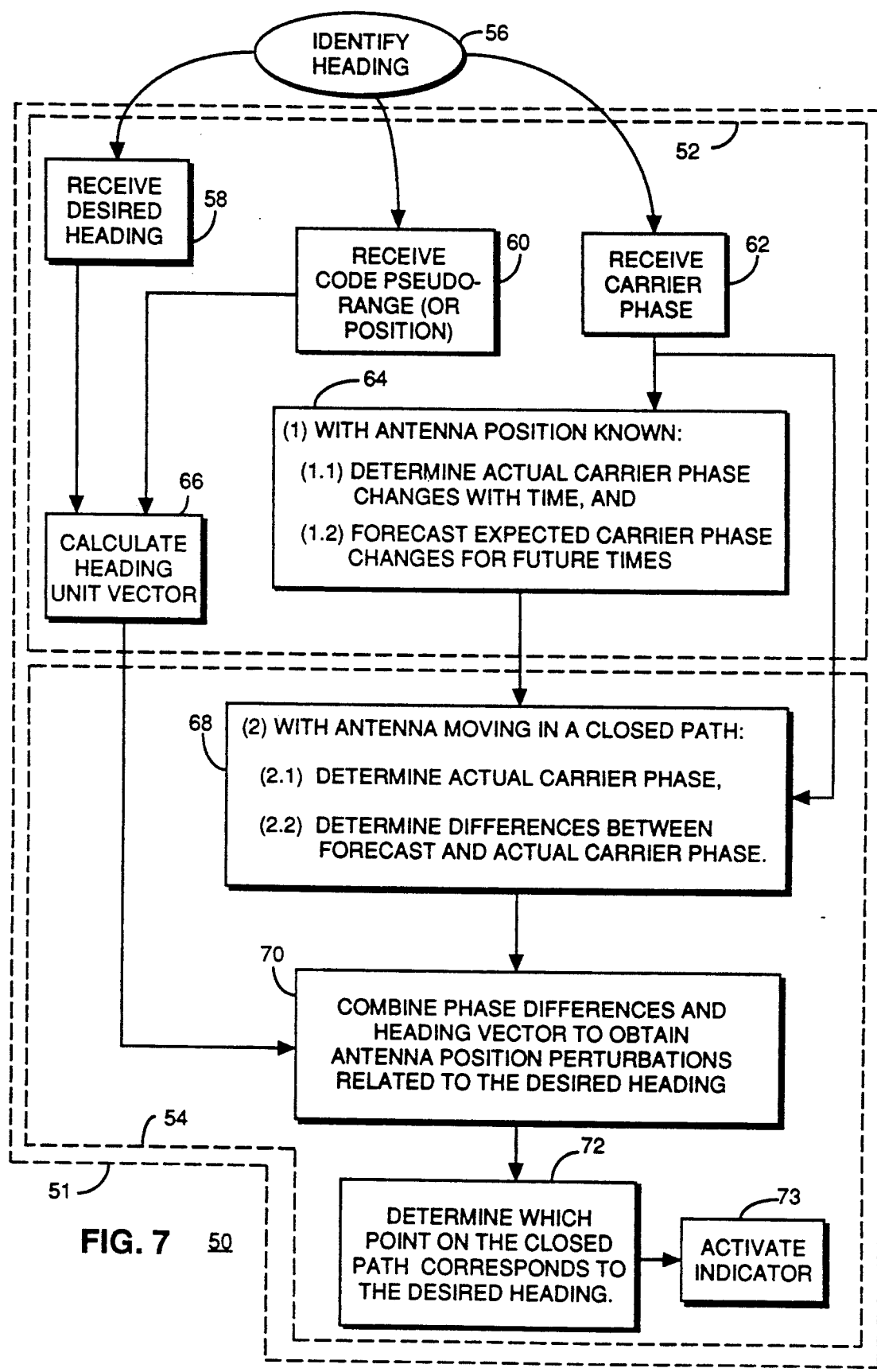
FIG. 7 is a simplified logical flow chart for carrying out a heading determination procedure according to the present invention.

FIG. 7 shows simplified logic flow chart 50 of the operations performed by processor 16 of apparatus 10 during observation interval and task 51. Observation interval and task 51 comprises calibration interval and task 52 plus measurement interval and task 54. Reference should also be had to FIGS. 1-6.

When "identify heading" task 56 in FIG. 7 is initiated, tasks 58, 60, 62 are desirably executed. The desired heading may be received in task 58 directly from user 8 or may be retrieved from memory 18. It is not necessary that tasks 58, 60, 62 be executed simultaneously. For example, the inputs obtained by tasks 58 and 60 are not needed until tasks 66 and 70 are executed. While it is preferable to execute tasks 58, 60 and 66 during (or before) calibration interval 52 along with forecast task 64, it is not essential, since the information resulting from tasks 58, 60, 66 is not needed until task 70.

Actual carrier phase $\Phi_{mk}(t)$, obtained from geolocation satellite signal processors 28 in task 62, is passed to task 64 wherein, with antenna 12 is known positions (preferably stationary), the changes of carrier phase $\Phi_{mk}(t)$ with time are determined for time epochs $t = 1, 2, 3, \ldots N$ for satellites $k = 1, 2, \ldots, K$. Based on such observations that predicted carrier phase $\Phi_{pk}(t)$ during subsequent time epochs $t > N$ is forecasted (see, for example, equation 4). In a preferred embodiment, satellite signal processor 28 has multiple channels, each tracking a different one of the K satellites being observed. Hence, measured phase data $\Phi_{mk}(t)$ is readily obtained substantially simultaneously for each of the K satellites for each time epoch t.

The forecast carrier phase (e.g., $\Phi_{pk}(t)$, for $t > N$) generated in task 64 is passed to task 68 of measurement task 54. In task 68, with antenna 12 moving in a closed path as previously described, the actual carrier phase $\Phi_{mk}(t)$ is determined for $t > N$ and compared to the predicted carrier phase $\Phi_{pk}(t)$ for $t > N$ to determined the phase differences $\Delta\Phi_k(t)$ for each satellite k and time $t > N$. These perturbations are sent to task 70 wherein they are converted into antenna positional perturbations (or equivalent) resolved into components desirably corresponding to the components of the heading unit vector determined in task 66.

Task 70 conveniently provides orthogonal outputs representing (a) antenna motion toward (or away) from the desired heading and/or (b) antenna motion at right angles to the desired heading, as previously explained, although other representations of the closed-path-motion induced perturbation information may also be used. The output of task 70 wherein the phase difference information and the desired heading vector are correlated is sent to task 72. In task 72 it is determined when and/or where around closed path 11, indicator 22, 222 should be actuated in task 73 so as to indicate to the user the orientation of the heading desired to be indicated.

For convenience, the calculation of all vector quantities that involve no phase differences are shown as being made at the beginning of or during the calibration interval, but this is not essential. Further, while input of the user desired heading is shown as initiating the calibration cycle, this is merely for convenience of explanation and is not essential. The geolocation and heading information may be determined or input anytime (before, during, after) provided there remains sufficient time to calculate the needed unit vectors before converting the phase differences obtained during the measurement task 68 into positional perturbation components related to the desired heading (e.g., factors $\beta(t)$ and $\gamma(t)$) in task 70. It is generally preferred to calculate all the quantities that are substantially invariant during observation interval 51 at the earliest available time, and store them for later use.

While the process of FIG. 7 is simpler when antenna 12 is held stationary during calibration step 52, this is not essential. Non-random movement of antenna 12 not associated with path 11, which is observed during the observation interval and which continues on into the measurement interval, may be taken into account by, before or during the calibration interval, determining the phase changes associated with such non-random movement of antenna 12 and extrapolating that into the measurement interval in approximately the same manner as described above, so that $\Phi_{pk}(t)$, for $t > N$, includes the effect of such non-random movement.

For example, assume that antenna 12 is moving along a determinable path, that is, it has a non-random average motion independent of the closed path motion which will be introduced by the user. The phase changes created by such non-random average motion (as well as the other non-random effects such as satellite and earth motion, clock errors, etc., already discussed) are included in the carrier phase observations made during the calibration interval for $t < N$, and accounted for in predicting $\Phi_{pk}(t)$ for $t > N$. In this way the phase differences $\Delta\Phi_k(t)$ reflect substantially only the effect of motion in closed path 11 and not the non-random ongoing average motion.

Figure 8:
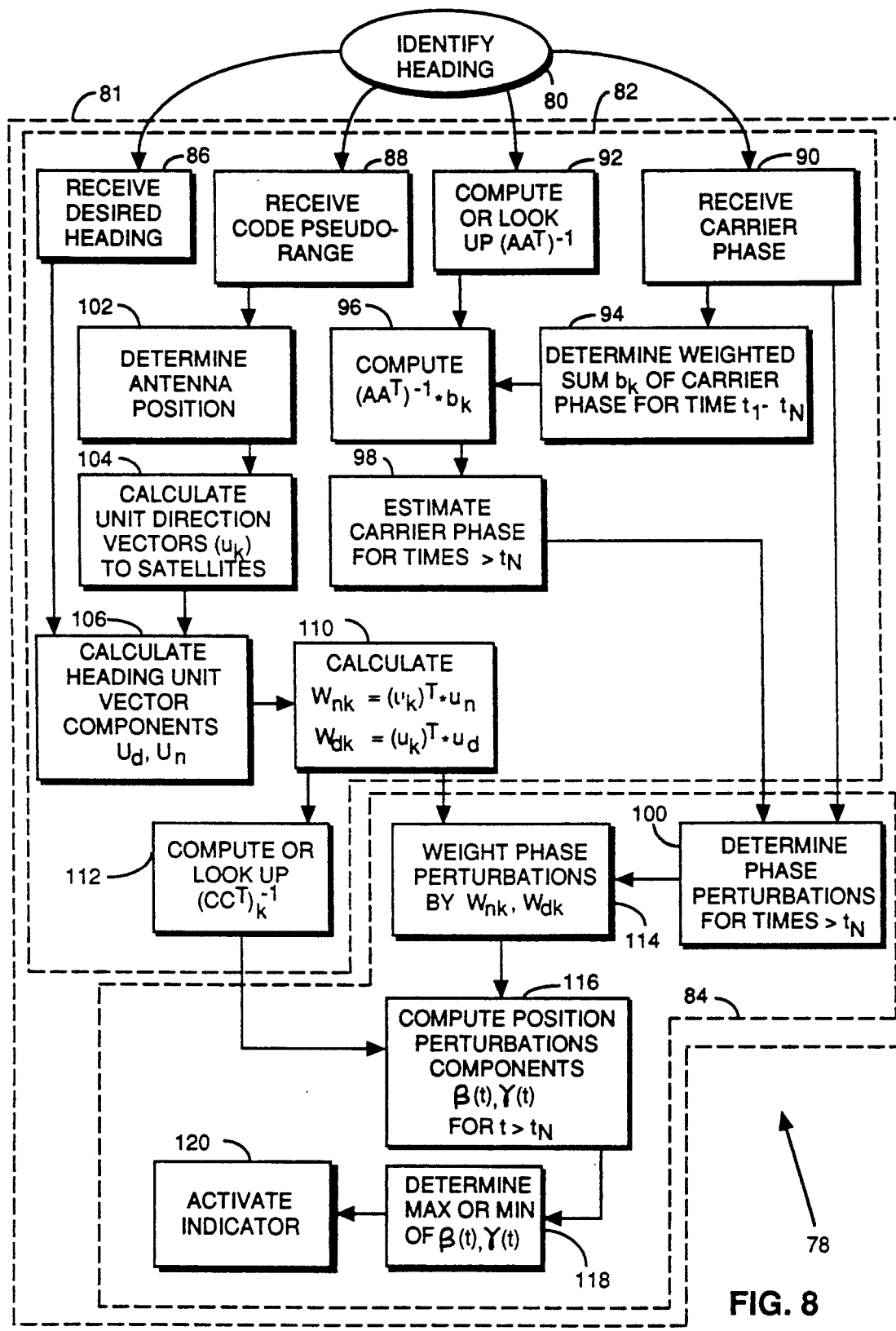
FIG. 8 is a simplified logical flow chart of the heading determination procedure of FIG. 7, but in greater detail.

FIG. 8 shows simplified logic flow chart 78, similar to FIG. 7 but in greater detail, of the operations performed by processor 16 of apparatus 10 during observation interval and task 81 according to a preferred embodiment of the invention. Reference should also be had to FIGS. 1-6. Observation task and interval 81 comprises calibration task and interval 82 and measurement task and interval 84.

When "identify heading" task 80 in FIG. 8 is initiated, tasks 86, 88, 90, 92 are desirably executed. The desired heading may be received in task 86 directly from user 8 or may be retrieved from memory 18. Task 92 to obtain the $(AA^T)^{-1}$ matrix may be retrieved from memory 18 or computed (e.g., see Eq. 2) based on parameters stored in memory 18. It is not necessary that tasks 86, 88, 90, 92 be executed simultaneously.

Actual carrier phase $\Phi_{mk}(t)$ obtained from satellite signal processors 28 in task 90 is passed to task 94 wherein, with antenna 12 in known positions (preferably stationary), the time weighted sum $b_k$ of $\Phi_{mk}(t)$ is determined for satellites $k=1, 2, \ldots K$ and time epochs $t=1, 2, 3, \ldots N$, according to Eq. 1. The result of task 94 is combined in task 96 with the $(AA^T)^{-1}$ matrix determined in task 92 to obtain the expansion coefficients as shown in Eq. 3, and in task 98 the estimated phase $\Phi_{pk}(t)$ for an antenna without the closed-path motion is forecasted according to Eq. 4 for subsequent time increments $t>N$. The forecast carrier phase (e.g., $\Phi_{pk}(t)$, for $t>N$) estimated in task 98 is passed to task 100 of measurement task 84. Where antenna 12 is moving during the calibration interval and expected to continue to move during the measurement interval (or to stop), then the effect of such is included in $\Phi_{pk}(t)$, for $t>N$ so that, as much as possible, $\Phi_{pk}(t)$ includes all non-random phase changes except those which will result from the closed path motion.

The code pseudorange values for each of the K satellites obtained in task 88 are used in task 102 in the conventional manner to determine the position of antenna 12. The known position of antenna 12 thereby determined is passed to task 104. In task 104, the known location of antenna 12 is combined with routinely available information on the orbital track of each of the K satellites to calculate the unit direction vectors $u_k$ from antenna 12 to each of the k satellites.

The desired heading information received in task 86 is combined in task 106 with the satellite direction vector information $u_k$ obtained from task 104 to calculate the heading unit direction vector components $u_d, u_n$ according to geometric relationships well known in the art, and passed to task 110 wherein the factors $w_{nk}=(u_k)^{T*}u_n$ and $w_{dk}=(u_k)^{T*}u_d$, are calculated. The result is passed to task 112 wherein the matrix $(CC^T)_k^{-1}$ is computed (e.g., see Eq. 10) based on the the factors $w_{dk}$ and $w_{nk}$. This completes calibration interval and task 82. Measurement interval and task 84 wherein antenna 12 is moved in closed path 11 desirably follows directly thereafter.

In measurement task and interval 84, with antenna 12 moving preferably in closed path 11 (or equivalent), the actual carrier phase $\Phi_{mk}(t)$ being provided by task 90 for $t>N$ is compared in task 100 to the predicted carrier phase $\Phi_{pk}(t)$ for $t>N$ provided by task 98 to determine the phase differences $\Delta\Phi_k(t))$ for each satellite k and time $t>N$. The phase perturbations determined in task 100 are passed to task 114 where they are weighted by the factors $w_{nk}, w_{dk}$, as shown for example in Eq. 11, and the result passed to task 116. In task 116, the result of task 114 is combined with the result of task 112 to compute the scalar factors $\beta(t)$ and $\gamma(t)$ for $t>N$ (e.g., see Eq. 12). The scalar factors $\beta(t)$ and $\gamma(t)$ are passed to task 118 where their maxima, minima and/or change of sign are detected as desired, depending upon the configuration of indicator 22, 42. The results of task 118 are used in task 120 to actuate indicator 22, 42 (e.g., see FIG. 2) at the appropriate moment when antenna 12 traverses location 25, 29 on path 11 (e.g., see FIGS. 3-6) corresponding to the heading desired to be indicated.

For convenience, the calculation of all vector quantities that involve no phase perturbations are shown in FIGS. 7-8 as being made during calibration interval 52, 82, but that is not essential. They may be made before, during or after. Further, while user input of the desired heading is shown as occurring at the beginning of calibration task 52, 82, this is merely for convenience of explanation and is not essential. The desired heading and the geolocation information may be input or determined anytime before, during or after calibration task 52, 82 provided there remains sufficient time to calculate the needed unit vectors before resolving the phase difference obtained during measurement interval 54, 84 into the $\beta(t)$ and $\gamma(t)$ components in task 70, 114, 116. It is generally preferred to calculate all the quantities that are substantially invariant during observation interval 51, 81 at the earliest available time, and store them for later use.

While apparatus 10 is shown as having processor 16 separate from satellite signal processors 28 (and vice-versa), this is merely for convenience of explanation. Those of skill in the art will understand based on the description herein that processor 16, provided it has sufficient accuracy and speed, can perform the calculations necessary to produce code pseudorange and carrier phase data and/or geolocation signal processors 28 with the same caveat on accuracy and speed) can also perform the operations described by the flow charts of FIGS. 7-8. Since the processors provided with many commercially available GPS units are capable of performing a variety of computations, the additional tasks shown by the process flow charts of FIGS. 7-8 may be accomplished by adding computer code to existing on-board (or additional memory, so as to reconfigure the existing processor to provide the operations described above. The choice will depend upon the capabilities of the GPS receiver processor being considered.

Where sufficient memory and computational capacity already exist, and an input and indicator already are present, no increase in size or weight of the GPS unit is required in order to include the heading indicating function described herein. Because of the widespread availability of processors and memory chips and indicator intended for use in battery powered apparatus, even if additional processor, memory and indicator capacity are needed to implement the above-described function, they require minimal additional space and weight. Further, they may be electronically disabled when not in use so as to minimize any additional power drain arising therefrom. Hence, the increased functionality provided by the present invention carries little or no cost or performance penalty, while adding substantially to the utility of a GPS receiver because a single hand holdable unit provides current heading as well as location. This combination is especially useful in emergency situations where it may be difficult or impossible to escape with or carry more than one navigational aid, or in areas where conventional compasses are ineffective due to magnetic disturbances.

Based on the foregoing explanation, those of skill in the art will understand that the present invention provides a means and method for obtaining current heading information (as well as conventional position information) from a geolocation receiver without resort to a conventional compass. Further, this is accomplished in a unit that is sufficiently small so as to be portable and able to be hand-held.

The present invention is especially convenient because, unlike prior art GPS based current heading indicators and methods, (a) only one antenna is needed, (b) only one GPS receiver is needed, (c) no predetermined measured baseline separating different antennas is needed, (d) the required antenna movement need not have a precisely known shape or path or be of predetermined known dimensions, (e) the apparatus uses information available from conventional GPS receivers or easily obtained therefrom with little modification, (f) the invention does not add significantly to the size and weight of GPS geolocation apparatus, (g) the invented apparatus is of a size and weight that may be easily held in a user's hand, (h) the required range of antenna motion is small enough that it may be executed by a person with a small hand-holdable apparatus, (i) the antenna motion may be generated either by hand motion or a relatively simple motorized or spinnable rotator, (j) highly precise code pseudorange values are not required, (k) non-random timewise variations in carrier phase data unrelated to the compass function may be automatically compensated, and (l) the user only need to input the heading desired to be indicated and, after a brief calibration interval, cause the unit to briefly move in a closed path, preferably lying approximately in the local level plane. A small motor or pivot may be used to spin the antenna in a small circular path and operation may be made entirely automatic, with the calibration and measurement steps and antenna movement being performed and controlled by the onboard processor.

While the means and method of the present invention have been described in terms of certain exemplary implementations, these are not intended to be limiting, and many variations and combinations will occur to those of skill in the art based on the description contained herein, without departing from the spirit of the present invention. For example, other means and methods may be used for measuring the rate of change of phase during the calibration interval while the unit is in known locations and forming therefrom a prediction of the phase changes to be expected during the measurement interval, unrelated to the closed-path motion. Further, while the operation of the present invention has been described particularly for closed-path motion provided directly by the user, this is not essential. Any means of moving the antenna during the measurement interval will serve.

Further, while a particular way of relating the observed phase perturbations to the desired heading are described, those of skill in the art will understand that other means and methods will also serve. For example, during the calibration interval, future phase values $\Phi_{pk}(t)$ are conveniently predicted using a second order polynomial expansion. The coefficient thereof are determinable by linear regression. Higher order polynomials, other means and methods for determining the coefficients and other means and methods for predicting future phase may also be used. During the measurement interval a preferred means and method is described for relating the phase differences to the desired heading, but those of skill in the art will understand based on the description herein, that other means and methods may be employed therefore and alternative arrangements and techniques may be used to actuate indicator 22 at the appropriate moment, so that the user is cognizant of the direction of the desired heading. Accordingly, it is intended to include these and such other variations as will occur to those of skill in the art based on the description herein, in the claims that follow.

What is claimed is:

1. A portable direction indicating apparatus comprising:
   input means for receiving information determinative of a heading a user desires to be indicated;
   an indicator for indicating the desired heading;
   a geolocation receiver for providing code pseudorange and carrier phase information and having an antenna;
   a memory for storing at least, the information determinative of the desired heading and forecasted carrier phase information; and
   computation means coupled to the input means, indicator, geolocation receiver and the memory for, (a) while the antenna is in one or more known positions, determining current carrier phase and forecasted carrier phase, (b) while the antenna is moving in a substantially closed path, determining phase differences between the forecasted carrier phase and the current carrier phase, and (c) actuating the indicator to identify when the location of the antenna in the approximately closed path corresponds to the desired heading to be indicated.

2. The apparatus of claim 1 wherein step (c) comprises determining antenna location perturbations based on the differences between the forecasted carrier phase and actual carrier phase.

3. The apparatus of claim 2 wherein the step of determining antenna location perturbations comprises determining location perturbations at least in a direction parallel to the desired heading to be indicated.

4. The apparatus of claim 3 wherein the actuating step comprises actuating the indicator based on the location perturbations in the direction parallel to the desired heading to be indicated.

5. The apparatus of claim 1 wherein the computation means comprises:
   means for determining directional vectors at the initial position between the geolocation receiver and geolocation satellites; and
   means for resolving the phase differences into vectors parallel to and normal to the desired heading.

6. The apparatus of claim 1 wherein the computation means comprises means for resolving the phase differences into first location differences when the antenna is moving along the desired heading or second location differences when the antenna is moving along a normal to the desired heading or both.

7. The apparatus of claim 6 wherein the computation means comprises means for actuating the indicator when the first or second location differences reach a maximum or minimum or change sign.

8. A heading indicating device comprising: a GPS apparatus having an antenna for receiving geolocation signals from multiple GPS satellites, said GPS apparatus including a computation means for computing location and current heading, a memory means for storing information and program instructions, an input means for receiving information sufficient to determine a heading desired to be indicated and an indicator means for indicating the direction of the heading desired to be indicated, said computation, memory, input and indicator means being coupled together, wherein said GPS apparatus is acted upon by said program instructions to, (i) determine GPS signal carrier phase $\Phi_{mk}$ (t) at predetermined time epochs t = 1,2, ..., N for signals from k = 1,2, ..., K satellites, and based thereon, forecast GPS signal carrier phase $\Phi_{pk}$ (t) at predetermined time epochs t > N, and (ii) while the antenna is moving in a substantially closed path, determine phase differences $\Delta\Phi_k$ (t) = $\Phi_{mk}$ (t) − $\Phi_{pk}$(t) for t > N, (iii) derive from the phase differences $\Delta\Phi_k$ (t), positional perturbations parallel to or normal to the desired heading or both, and (iv) actuate the indicator when at least one of the positional perturbations is a maximum or a minimum or changes sign.

9. The device of claim 8, further comprising motorized means for moving the antenna in said substantially closed path.

10. A method for indicating heading using a portable geolocation apparatus comprising an input for receiving information determinative of a heading desired to be indicated, an indicator for indicating the desired heading, a geolocation receiver providing code pseudorange and phase information and having an antenna, a memory and a computation means coupled together, the method comprising steps of:

(a) while the antenna is in one or more known positions, determining then current carrier phase and future forecasted carrier phase;

(b) while the antenna is moving in a substantially closed path, determining phase differences between the forecasted carrier phase and now current carrier phase; and (c) actuating the indicator to identify when the location of the antenna in the substantially closed path corresponds to the heading desired to be indicated.

11. The method of claim 10 wherein step (c) comprises determining antenna location perturbations based on the differences between the forecasted carrier phase and the now current carrier phase.

12. The method of claim 11 wherein the step of determining the location perturbations comprises determining location perturbations at least in a direction parallel to the heading desired to be indicated.

13. The method of claim 12 wherein the actuating step comprises actuating the indicator based on a maximum of the location perturbations in the direction parallel to the heading desired to be indicated.

14. The method of claim 10 further comprising, prior to the actuating step, determining unit vector directions from the antenna to geolocation satellites from which the antenna is receiving signals.

15. The method of claim 14 further comprising determining a unit heading vector in the direction of the heading desired to be indicated.

16. The method of claim 15 further comprising determining positional differences along and normal to the unit heading vector based on the phase differences.

17. A method for indicating a desired heading in an apparatus comprising a GPS receiver having an antenna for receiving geolocation signals from multiple GPS satellites, said receiver including coupled computation, memory, input and indicator means, said method comprising:

(i) determining GPS signal carrier phase $\Phi_{mk}$ (t) at predetermined time epochs t = 1,2, ..., N for signals from k = 1,2, ..., K satellites, and based thereon, forecasting carrier phase $\Phi_{pk}$ (t) at predetermined time epochs t > N, and (ii) while the antenna is moving in a substantially closed path, determining phase differences $\Delta\Phi_k$ (t) = $\Phi_{mk}$ (t) − $\Phi_{pk}$ (t) for t > N, (iii) deriving from the phase differences $\Delta\Phi_k$ (t), positional perturbations parallel to or normal to the desired heading or both, and (iv) actuating the indicator means substantially when at least one of the positional perturbations is a maximum or a minimum or changes sign.

18. The method of claim 17 wherein step (iii) comprises, determining a vector corresponding to the heading desired to be indicated and then resolving the positional perturbations into scalar factors related to magnitudes of phase perturbations along and normal to the desired heading.

19. The method of claim 18 wherein the step of deriving positional perturbations comprises determining prior thereto, vectors corresponding to directions from the antenna to the satellites k = 1,2, ..., K.

20. The method of claim 19 wherein step (ii) takes place while the antenna is moved in a substantially closed path by rotation around a pivot or motor spindle.

* * * * *